Nov. 30, 1971 J. C. CLARK 3,623,228
SPHERICAL TRIANGLE RESOLVER
Filed Dec. 6, 1968 2 Sheets-Sheet 1

INVENTOR
Joseph C. Clark
BY William M. Holly
ATTORNEY

INVENTOR
Joseph C. Clark
BY William M. Hobby
ATTORNEY

United States Patent Office 3,623,228
Patented Nov. 30, 1971

3,623,228
SPHERICAL TRIANGLE RESOLVER
Joseph C. Clark, 4843 Backacher Lane,
Orlando, Fla. 32806
Filed Dec. 6, 1968, Ser. No. 781,909
Int. Cl. G01c 21/20
U.S. Cl. 33—1 SA
6 Claims

ABSTRACT OF THE DISCLOSURE

A spherical triangle resolving apparatus for determining a great circle course and the distance over the great circle course from an instant position to an objective position from inputs of the instant latitude, the objective latitude and the difference in longitude of the two positions. The inputs of instant latitude, objective latitude and difference in longitude each move a single shaft, which shaft is coupled to a pair of intersecting shafts in such a manner that the movement of the intersecting shafts provides outputs of the course and distance on dials that remain in a fixed plane relative to the base of the apparatus.

BACKGROUND OF THE INVENTION

The present invention is related to the invention in my copending application Ser. No. 746,608, for Spherical Triangle Resolver, filed July 22, 1968 now U.S. Pat. No. 3,507,446.

(1) Field of the invention

The present invention relates to mechanical computers and more specifically to a spherical triangle resolver especially adapted for use in the field of navigation for determining course and distance from an instant position to an objective position. In particular a mechanical device is provided having inputs of the instant latitude, the objective latitude and the difference between the instant and objective longitudes, and an output indicating the great circle course and the distance to the objective position over the great circle course.

(2) Description of the prior art

The great circle course is the course indicating the shortest distance between two points on a sphere, with the earth being taken as a perfect sphere. Other types of courses are used, but from any but the shortest distances, the great circle course is preferred since the distance traveled will be shorter.

In the past several methods have been used to determine the great circle course and the distance to the objective position over this course. These include the mathematics of solving the spherical triangle using as known points the present location, the objective and a pole of the earth. That is to say from a navigator's known latitude of position and objective, two sides of a triangle can be determined and from the difference in longitude between the instant position and objective position the angle between the two sides can be determined. The angle of the course can be determined, as can be the distance between the positions, by the use of spherical trigonometry.

However, mathematical solving for the course and distance is time consuming, and subject to errors in calculations. Accordingly, other methods have been developed to solve for the course. One such method has been to program an electronic computer to perform the necessary calculations. The computer is, of course, expensive and time consuming in making the necessary inputs while still subject to human errors during the programming operation.

SUMMARY OF THE INVENTION

A spherical triangle resolving apparatus for determining a great circle course and the distance over the great circle course from an instant position to an objective position from inputs of the instant latitude, the objective latitude and the difference in longitude of the two positions.

A pair of shafts are movably connected and adapted to be moved by the inputs of instant and objective latitude and difference of longitude inputs. The longitudinal axes of the shafts form an imaginary plane indicating the great circle course of the inputs. A third shaft is located substantially perpendicular to the pair of shafts and is adapted to rotate in accordance with the inputs of the instant and objective latitude and difference in longitude, with the angle of rotation of the third shaft being adapted to indicate the distance between the instant and objective positions. The longitudinal axes of the pair of shafts and the longitudinal axis of the third shaft intersect at a common center point. The connecting means for the pair of shafts is utilized in the output means and may rotate the pair of shafts around their longitudinal axis when the inputs vary the positions of the shafts around the center point.

BRIEF DESCRIPTION OF THE DRAWINGS

Other objects, features and advantages of this invention will be apparent from a study of the written description and the drawings, in which.

DESCRIPTION OF THE PREFERRED EMBODIMENT

Figure 1:
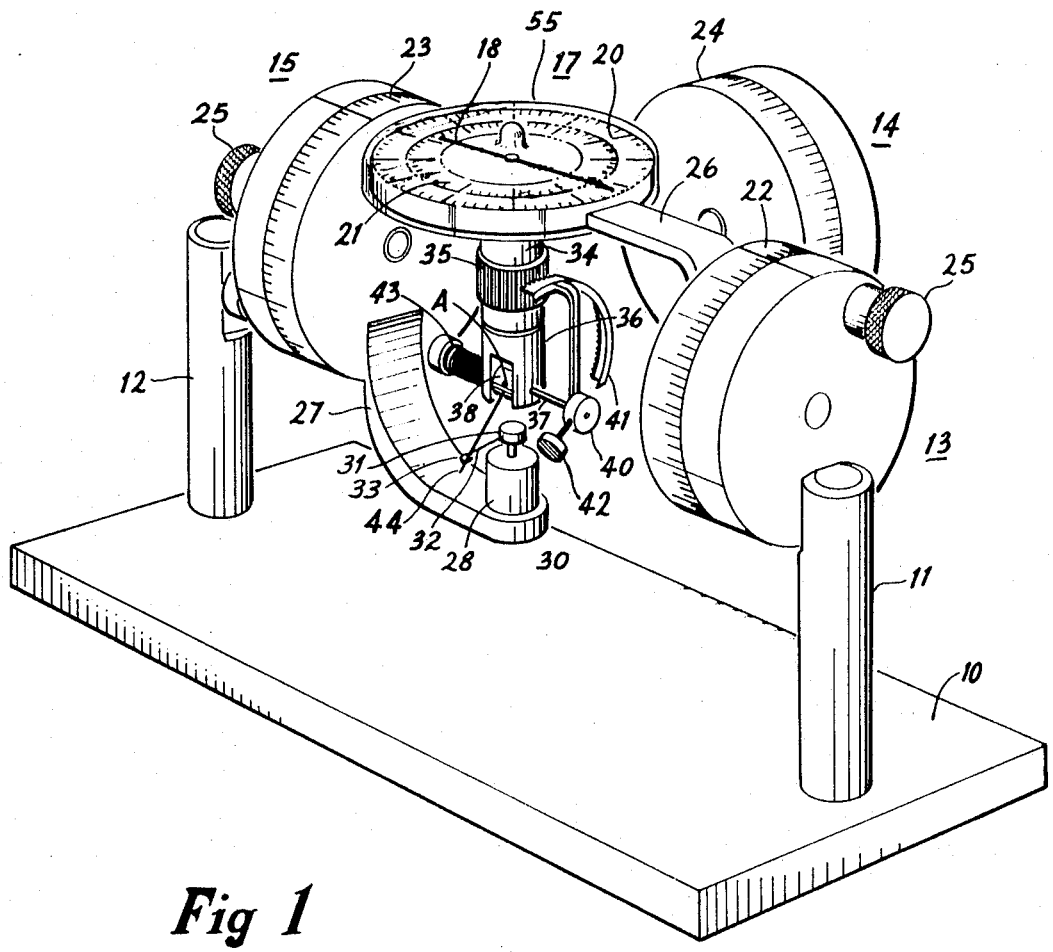
FIG. 1 is a perspective view of one embodiment of the present invention.
Figure 2:
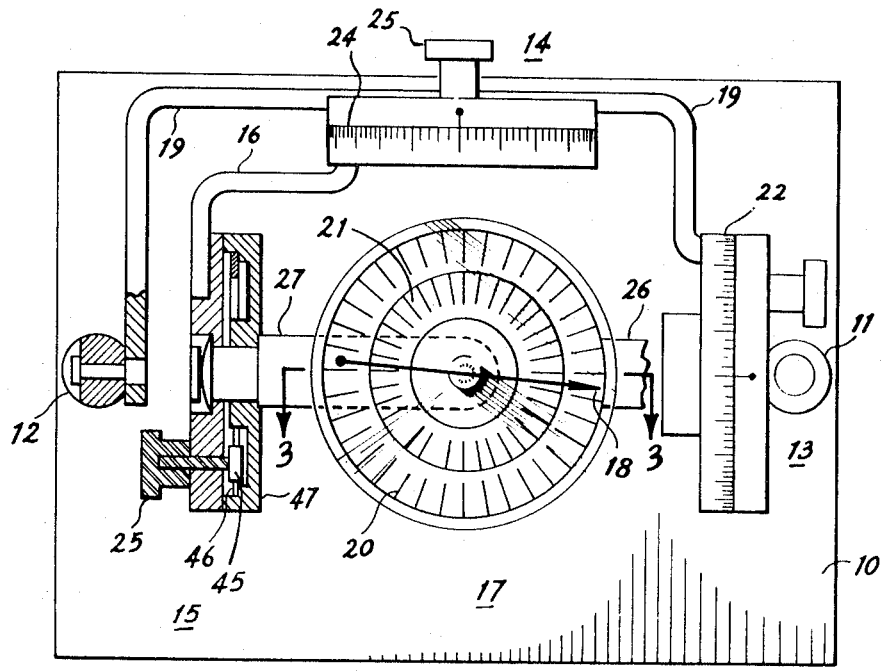
FIG. 2 is a top plan view of the embodiment of FIG. 1.

FIGS. 1 and 2 illustrate a preferred embodiment on a support structure 10 having fixedly attached posts 11 and 12. Post 11 has a latitude of instant position dial assembly 13 fixedly attached thereto and post 12 has a bracket 19 movably attached to it and also connected to the difference in longitude dial assembly 14 while a latitude of objective position dial assembly 15 is fixedly connected by bracket 16 to a part of dial assembly 14 which is rotatably related to bracket 19. Bracket 19 is also fixedly connected to a rotatable part of dial assembly 13. A course and distance indicator 17 has a needle 18 and a course dial graduated in degrees from zero to 360, and a distance dial 21 graduated from zero to 5400 miles or approximately ½ the distance from the North to the South Poles (90 degrees), traveling on the surface of the earth and assuming a perfect sphere as the earth. The needle 18 points to the great circle course on dial 20 and on dial 21 to the distance from the instant position to an objective position when the device is provided with inputs of latitude of instant position on dial 22 of dial assembly 13, latitude of objective position on dial 23 of dial assembly 15 and difference in longitude between the instant and objective position on dial 24 of dial assembly 14. As can be seen distance dial 21 rotates within course dial 20 so that the distance to the objective position is indicated by needle 18.

Input dial 22 for the instant position and input dial 23 for the objective position are graduated in degrees from zero (Equator) plus and minus 90 degrees or to the North and South Poles while dial 24 is graduated in degrees from zero each way to 180 degrees and is settable to the difference in longitude between the instant position and the objective position.

Dials 22, 23 and 24 may be operated by rotating knobs 25 which rotate pinions 45 inside the dial assemblies 13, 15 and 14 respectively, which pinions may engage internal gears 46 attached to each dial. It should, of course, be clear that dials 22, 23 and 24 can be rotated in any desired means without departing from the scope and spirit of the present invention.

Rotation of knob 25 of dial assembly 13 rotates dial 22 along with fixedly attached bracket 19 and in turn moves dial assembly 14, with bracket 16 fixedly attached thereto and bracket 27 fixedly attached to dial assembly 15. Bracket 26 is fixedly attached to course and distance indicator assembly 17 and to dial assembly 13 and does not move relative to the support 10. Rotation of dial 24 will move dial assembly 15 by means of bracket 16 being fixedly connected therebetween and also bracket 27 attached to dial assembly 15. Rotation of dial 23 will also move bracket 27 which is fixedly attached thereto. Bracket 27 has a tube 28 with a shaft 30 having a head portion 31 which shaft 30 freely rotates in tube 28. An arm 32 with a hooked end 33 is fixedly attached to head 31 and rotates therewith.

Dial 21 is connected to a tube 34 having a gear surface 35 so that rotation of the tube 34 rotates the dial 21. A clevis 36, which is the end portion of a rotatable shaft, is fixedly connected to needle 18 and rotates therewith as will be explained in more detail in connection with FIG. 3. Clevis 36 has a rotatable shaft 37 passing through and perpendicular to it with a collar member 38 which is generally cylindrical shaped and adapted to rotate with shaft 37. At one end of shaft 37 is a member 40 having a gear segment 41, which engages gear 35. A counterbalance 42 counterbalances the mass of the segment 41. On the opposite side of the clevis 36 from the gear segment 41, there is a spring 43 which places a torque on shaft 37. An arm 44 is fixedly attached to member 38 and rotatable therewith and extends through hook 33 of arm 32 where it is held by the spring 43 biasing the arm 44 outwardly against hook 33. Arm 44 extends perpendicular to and rotates with shaft 37 and arm 33 may be fixedly attached perpendicular or at any desired angle to rotatable shaft 30. The longitudinal axes of shaft 30, arm 44, shaft 37 and tube 34 coincide at an imaginary center point "A" which point is indicative of the center of a sphere or of the earth.

Referring more specifically to FIG. 2 a plan view can be seen of course and distance indicator 17 including, dials 20 and 21 and needle 18. Knobs 25 and dial assemblies 13, 14 and 15 may also be viewed as may brackets 16, 19, 26 and 27 and dials 22 and 24. A cutaway of dial assembly 15 shows pinion 45 connected to knob 25 and engaged in internal gear 46 attached to the dial assembly member 47 of the dial assembly 15. Rotation of the pinion 45 rotates member 47 and consequently bracket 27. A better view of how rotation of dial 24 moves bracket 16, and dial assembly 15 may be seen from this view.

Figure 3:
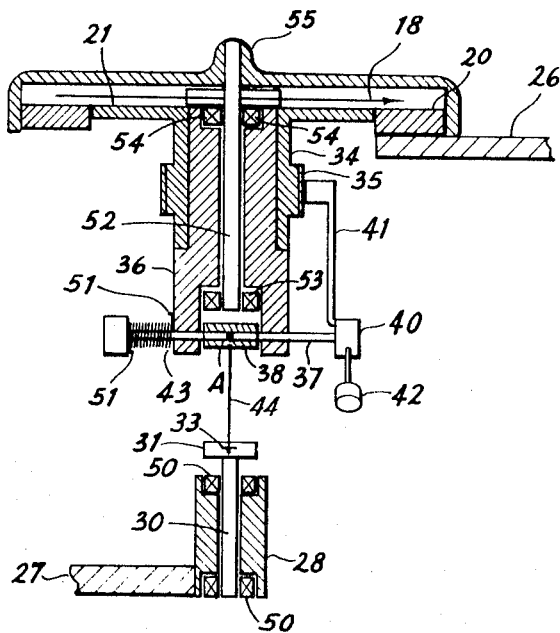
FIG. 3 is a sectional view taken along line 3—3 of FIG. 2.

Turning now to FIG. 3 a sectional view taken along line 3—3 more clearly illustrates the operation of the invention and shows bracket 27, fixedly connected to tube 28 having shaft 30 with head 31. Shaft 30 rotates on bearings 50 and head 31 has arm 32 with hook 33 fixedly connected in one side thereof. Arm 44 passes through hook 33 and is fixedly connected to collar member 38, wihch is in turn fixedly connected to shaft 37. Shaft 37 rides in clevis 36 and is biased around its longitudinal axis by spring 43 held by pins 51. Member 40 is connected to one end of shaft 37 and has gear segment 41 and counterbalance 42 connected to it. Gear 41 engages gear 35 forming a part of tube 34 which forms a part of distance dial 21. Clevis 36 extends through tube 34 and fixedly holds needle 18 for rotation therewith which needle 18 is rotatably connected to a shaft 52 riding on bearings 53 and 54. Shaft 52 is fixedly held by a cover 55. One end of shaft 52 may be connected to cover 55 by a press fit or by any other means desired. Cover 55 is fixedly attached to course dial 20 which is in twin fixedly attached to bracket 26.

At this point it can be seen that rotation of shaft 37 will rotate gear segment 41 and tube 34 which rotates distance dial 21. Rotation of clevis 36, on the other hand, rotates needle 18. If clevis 36 and shaft 30 are displaced relative to each other, the connection between them including arms 44 and 32, will be urged by spring 43 to rotate clevis 36 and shaft 30 to align with an imaginary plane formed by the longitudinal axes of shafts 30 and 52. The axis of arm 44 will also lie in the common plane, which plane will be indicative of the great circle course. The degree of rotation of shaft 37 within the imaginary plane will be indicative of the distance between an instant and objective position. That is to say once a plane is formed between the center of a sphere and two positions on the surface of the sphere, the angle of rotation of a perpendicular axis at the center of the sphere from one point to another is analogous to the distance or what portion of the distance around the surface of the sphere (or semisphere as in this case) is between the two positions in the same plane.

As will be clear to those skilled in the art, what is being done is to form a plane with center point "A" (FIG. 1) and the axes of shafts 30 and clevis 52, which are forced to rotate by the connection between them having arm 44 spring biased against hook 33 of arm 32. Point "A" is analogous to the center of the earth, while the axes of shaft 30 and clevis 36 represent lines from the center point "A" to the surface of a sphere intersecting this surface at the instant and objective position, one such line being 180 degrees out of phase as though on the opposite side of the sphere.

This invention is not to be construed as limited to the particular forms disclosed herein, since these are to be regarded as illustrative rather than restrictive.

I claim:

1. A spherical triangle resolver comprising in combination:
   (a) input means for receiving inputs of instant latitude, objective latitude and difference in longitude between an instant position and an objective position, said instant latitude input means being connected to said difference in longitude input means and said difference in longitude input means being connected to said objective latitude input means;
   (b) a pair of connected shaft means adapted to be moved by said input means, the longitudinal axes of said pair of shaft means forming an imaginary plane indicative of the great circle course between said instant and objective positions of the inputs of said input means, one of said pair of shaft means being connected to said input means for receiving inputs of said instant latitude, objective latitude and difference in longitude;
   (c) a third shaft means located substantially perpendicular to said pair of shaft means, with the longitudinal axes of said pair of connected shaft means and of said third shaft means intersecting at a common center point, said point being analogous to the center of an imaginary sphere; said third shaft means being adapted for rotation about its longitudinal axis, with the degree of rotation being indicative of the distance between the instant and objective positions of the inputs of said input means and said third shaft means having spring torquing means for torquing said third shaft about its longitudinal axis;
   (d) said pair of shaft means having a connecting means having at least one arm, having a longitudinal axis passing through said common center point, said arm being connected to said third shaft means for rotation therewith; and (e) output means adapted to produce readouts of the great circle course between the instant and objective positions from said pair of shaft means and the distance between said instant and objective positions from said third shaft means.

2. The apparatus according to claim 1 in which said third shaft means is rotatably connected to one of said pair of shaft means.

3. The apparatus according to claim 2 in which said third shaft has biasing means for biasing said arm outwardly against the end of a second arm connected to the other of said pair of shafts.

4. The apparatus according to claim 2 in which at least one of said pair of shaft means is rotatably connected to said output means whereby rotation of said one shaft will produce a readout of course.

5. The apparatus according to claim 4 in which said third shaft means is connected to said output means for producing a readout of distance.

6. The apparatus according to claim 5 further comprising a gear segment attached to said third shaft means for rotation therewith, and a gear connected to said distance readout output means, which gear engages said gear segment.

References Cited

UNITED STATES PATENTS

| | | | |
|---|---|---|---|
| 1,016,176 | 1/1912 | Roca | 33—1.5 A X |
| 1,895,606 | 1/1933 | Burns | 33—1.5 A |
| 2,108,260 | 2/1938 | Harris | 33—1.5 A |

FOREIGN PATENTS

| | | | |
|---|---|---|---|
| 946 | 4/1866 | Great Britain | 33—1.5 A |

ROBERT B. HULL, Primary Examiner

U.S. Cl. X.R.

235—61 NV